(12) United States Patent
Yang

(10) Patent No.: US 8,296,672 B2
(45) Date of Patent: Oct. 23, 2012

(54) SYSTEM FOR VISUALIZING A COMMUNITY ACTIVITY AND A METHOD THEREOF

(75) Inventor: Zoo Il Yang, Uiwang (KR)

(73) Assignee: NHN Corporation, Seongnam-si (KR)

( * ) Notice: Subject to any disclaimer, the term of this patent is extended or adjusted under 35 U.S.C. 154(b) by 1065 days.

(21) Appl. No.: 11/568,869

(22) PCT Filed: May 9, 2005

(86) PCT No.: PCT/KR2005/001349
§ 371 (c)(1),
(2), (4) Date: Nov. 9, 2006

(87) PCT Pub. No.: WO2005/109233
PCT Pub. Date: Nov. 17, 2005

(65) Prior Publication Data
US 2007/0220128 A1  Sep. 20, 2007

(30) Foreign Application Priority Data

May 11, 2004  (KR) .................. 10-2004-0032988

(51) Int. Cl.
*G06F 3/048* (2006.01)
(52) U.S. Cl. ......... 715/772; 715/753; 715/757; 715/758
(58) Field of Classification Search .................. 345/667; 715/792, 802, 753, 757, 758, 772
See application file for complete search history.

(56) References Cited

U.S. PATENT DOCUMENTS

| | | | |
|---|---|---|---|
| 6,381,632 B1* | 4/2002 | Lowell | 709/203 |
| 6,594,673 B1* | 7/2003 | Smith et al. | 1/1 |
| 6,708,172 B1* | 3/2004 | Wong et al. | 707/10 |
| 6,874,024 B2* | 3/2005 | Cohen et al. | 709/224 |

(Continued)

FOREIGN PATENT DOCUMENTS

KR  10-2001-0091193 A  10/2001

(Continued)

OTHER PUBLICATIONS

Donath, J. et al. "Visualizing Conversation", Proceedings of the 32nd Hawaii International Conference on System Sciences—1999.*

(Continued)

*Primary Examiner* — Ba Huynh
(74) *Attorney, Agent, or Firm* — H.C. Park & Associates, PLC (57) ABSTRACT

Disclosed is a system and method for visualizing a visitor's activity in a community such as a cafe, homepage, blog, miniroom, or mini-homepage, and the like, which are established in web sites on the Internet. The method includes the steps of: a) by a visitor, accessing the community and selecting a community activity visualizing item prepared in the community; b) by the visitor, selecting one of a plurality of blocks forming an image of the community activity visualizing item; c) by the visitor, leaving a visitor log in a text input window corresponding to the selected block; and d) storing data in which the visit log is recorded and updating the community activity visualizing item. According to the present invention, by visually providing community activity visualizing items, which are contents allowing community visitors to dynamically participate in the community, a plurality of visitors can be attracted to participate in the community, the extent of participation of the visitors in the community increases, and re-visit of the visitors to the community can be promoted.

11 Claims, 9 Drawing Sheets

U.S. PATENT DOCUMENTS

| | | | | |
|---|---|---|---|---|
| 6,952,219 | B2 * | 10/2005 | Lee | 345/593 |
| 6,961,910 | B2 * | 11/2005 | Lee et al. | 715/853 |
| 6,970,931 | B1 * | 11/2005 | Bellamy et al. | 709/227 |
| 7,103,609 | B2 * | 9/2006 | Elder et al. | 707/102 |
| 7,167,910 | B2 * | 1/2007 | Farnham et al. | 709/223 |
| 7,249,123 | B2 * | 7/2007 | Elder et al. | 1/1 |
| 7,330,845 | B2 * | 2/2008 | Lee et al. | 707/2 |
| 7,343,365 | B2 * | 3/2008 | Farnham et al. | 715/853 |
| 7,373,606 | B2 * | 5/2008 | Gorzela | 715/738 |
| 7,613,776 | B1 * | 11/2009 | Ben-Yoseph | 709/206 |
| 7,685,016 | B2 * | 3/2010 | Flores et al. | 705/11 |
| 2002/0133548 | A1 * | 9/2002 | Erickson et al. | 709/204 |
| 2002/0154171 | A1 * | 10/2002 | Lee et al. | 345/781 |
| 2003/0158855 | A1 * | 8/2003 | Farnham et al. | 707/102 |
| 2003/0167324 | A1 * | 9/2003 | Farnham et al. | 709/224 |
| 2003/0191816 | A1 * | 10/2003 | Landress et al. | 709/219 |
| 2004/0122681 | A1 * | 6/2004 | Ruvolo et al. | 705/1 |
| 2004/0122803 | A1 * | 6/2004 | Dom et al. | 707/3 |
| 2004/0122855 | A1 * | 6/2004 | Ruvolo et al. | 707/104.1 |
| 2004/0153456 | A1 * | 8/2004 | Charnock et al. | 707/10 |
| 2004/0259641 | A1 * | 12/2004 | Ho | 463/42 |
| 2005/0060287 | A1 * | 3/2005 | Hellman et al. | 707/2 |
| 2005/0159970 | A1 * | 7/2005 | Buyukkokten et al. | 705/1 |
| 2005/0165891 | A1 * | 7/2005 | Moody et al. | 709/204 |
| 2006/0121988 | A1 * | 6/2006 | Reville et al. | 463/42 |
| 2006/0178860 | A1 * | 8/2006 | Glass et al. | 703/6 |
| 2009/0287685 | A1 * | 11/2009 | Charnock et al. | 707/5 |

FOREIGN PATENT DOCUMENTS

| | | |
|---|---|---|
| KR | 10-2001-0094096 A | 10/2001 |
| KR | 10-2003-0039346 A | 5/2003 |
| KR | 10-2003-0063080 A | 7/2003 |

OTHER PUBLICATIONS

Viegas et al. (hereinafter Viegas) "Digital Artifacts for Remembering and Storytelling: PostHistory and Social Network Fragments" Proceedings of the 37th Hawaii International Conference on System Sciences; Jan. 2004.*

Schneidermann, B. et al. "Treemaps for space-constrained visualization of hierarchies" Dec. 1998.*

Web archive.org, "Loom—first implementation" Feb. 2002.*

Whittaker, S.et al. "ContactMap: Using Personal Social Networks to Organize Communication in a Social Desktop" Nov. 2002.*

Whittaker, S. et al. "ContactMap: Integrating Communication and Information through Visualizing Personal Social Networks" ACM 2001.*

Marc Smith, et al. "Visualization Components for Persistent Conversations" Mar. 2001.*

Jeff Heer et al. "Vizter: Visualizign Online Social Networks" Oct. 2005, which shows and discusses several related visualization systems prior to 2004.*

* cited by examiner

SYSTEM FOR VISUALIZING A COMMUNITY ACTIVITY AND A METHOD THEREOF

CROSS REFERENCE TO RELATED APPLICATIONS

This application is a U.S. National Application of International Application PCT Application No. PCT/KR2005/001349 filed on May 9, 2005, which claims the benefit of priority from Korean Patent Application No. 10-2004-0032988 filed on May 11, 2004. The disclosures of International Application PCT Application No. PCT/KR2005/001349 and Korean Patent Application No. 10-2004-0032988 are incorporated herein by reference.

TECHNICAL FIELD

The present invention relates to a system and method for visualizing community activity, and more particularly, to a system and method for visualizing a visitor's activity in a community such as a café, homepage, blog, miniroom, or mini-homepage, and the like, which are established in web sites on the Internet.

BACKGROUND ART

At present, there exist various websites providing Internet community services. In these Internet community sites, a community operator can establish a community by applying for the community to a relevant Internet Service Provider, and users can become members of the community by subscribing to the community. The community operator and the members compose one community.

In current Internet community services, one community continues to exist, in principle, as an individual, which is separate from other communities. Optionally, it could be designed to allow communities to share information according to operation methods of the Internet Service Providers.

In current Internet community services, horizontal movement from one community to another is possible, and each of the Internet communities includes one or more public or private bulletin board.

Further, a blog, which is an abbreviation of web log, refers to a new form of web service having complex functions of web bulletin boards, individual homepages, and communities. Typically, the blog service is a service provided to solve problems such as anonymity, unidirectionality, low contents notice rate, and the like, which are disadvantages of conventional Internet bulletin boards. A blog is a kind of individual media community having an exclusive area assigned on a network using simple text and graphics. That is, since a blog service can obtain the effect of security and confidentiality of an individual homepage while providing service subscribers with a simple creation technique that does not require knowledge related to use of existing homepage creation programs and creation of Internet homepages, it is an actual circumstance that the range of users has rapidly expanded.

More particularly, it is known that John Barger first used the term 'web log' in November of 1997, and the term 'log' has the meaning of logbook or travel diary. In a blog, which is a site for blogging and was invented by Evan Williams, a blog is defined as a "web page consisting of short sentences which are updated periodically, like a diary". Thus, anyone can set such a blog in his own web site and download and use a blog program without fee as long as the blog has server space in which the blog program can be installed. Also, the blog is free of charge and is easy to handle, and, once it is set on a website, a user can always publish his sentences on-line whenever he wishes to write the sentences.

Until now, netizens have used individual homepages to let their existences or opinions be know on-line. To this end, however, they had to be able to handle webpage creation tools, such as Namo Web Editor and the like, and may also have had many difficulties in management, such as updating and the like, of the individual homepages. On the contrary, as mentioned above, the blog is free of charge and is easy to handle, and, once it is set on a website, a user can easily enter his sentences online, allowing anyone to make an easy access to the blog.

Recently, a portal site, Naver, (www.naver.com), has started provision of a service, 'cafeiN', and naver café has three hundreds of thousands of associations of like-minded persons, and two thousands of associations of like-minded persons are being newly established on average per day. The portal site, Naver, interlinks two services, that is, a service allowing a visitor to leave a sentence in a café and another service allowing the sentence and its source to be noticed in the visitor's blog.

Figure 1:
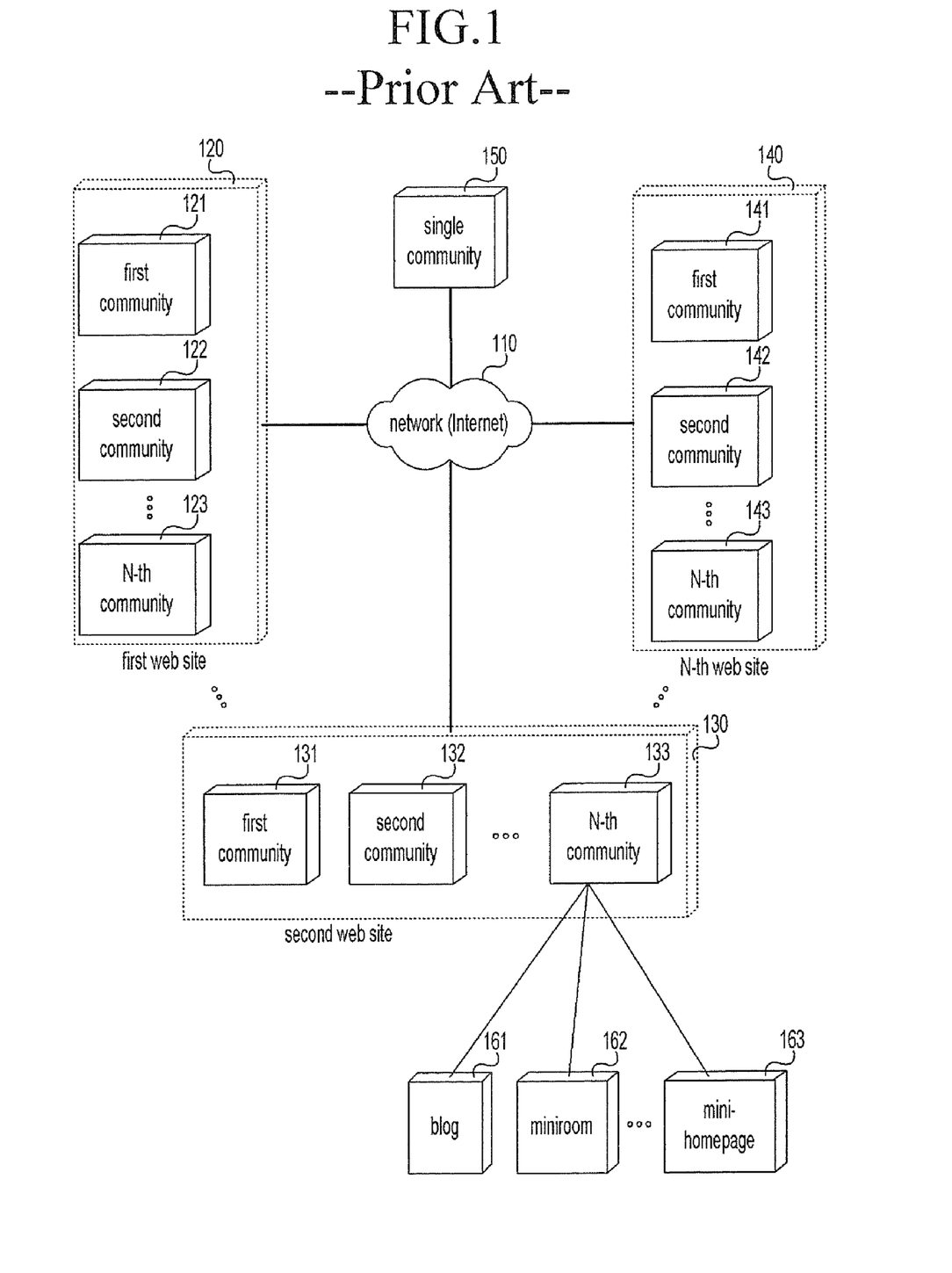
FIG. 1 is a schematic diagram illustrating configuration of a conventional community on an Internet network.

FIG. 1 is a schematic diagram illustrating configuration of a conventional community on an Internet network.

Referring to FIG. 1, the conventional community can be implemented with a plurality of websites 120, 130, and 140 and a single community 150 and the like, all of which are connected through the Internet 110. The plurality of websites 120, 130, and 140 include first to N-th communities 121, 122, and 123, 131, 132, and 133, 141, 142, and 143, respectively. In this case, each of the first to N-th communities 121, 122, and 123, 131, 132, and 133, 141, 142, and 143 may include a blog 161, a miniroom 162, a mini-homepage 163, and the like.

Figure 2:
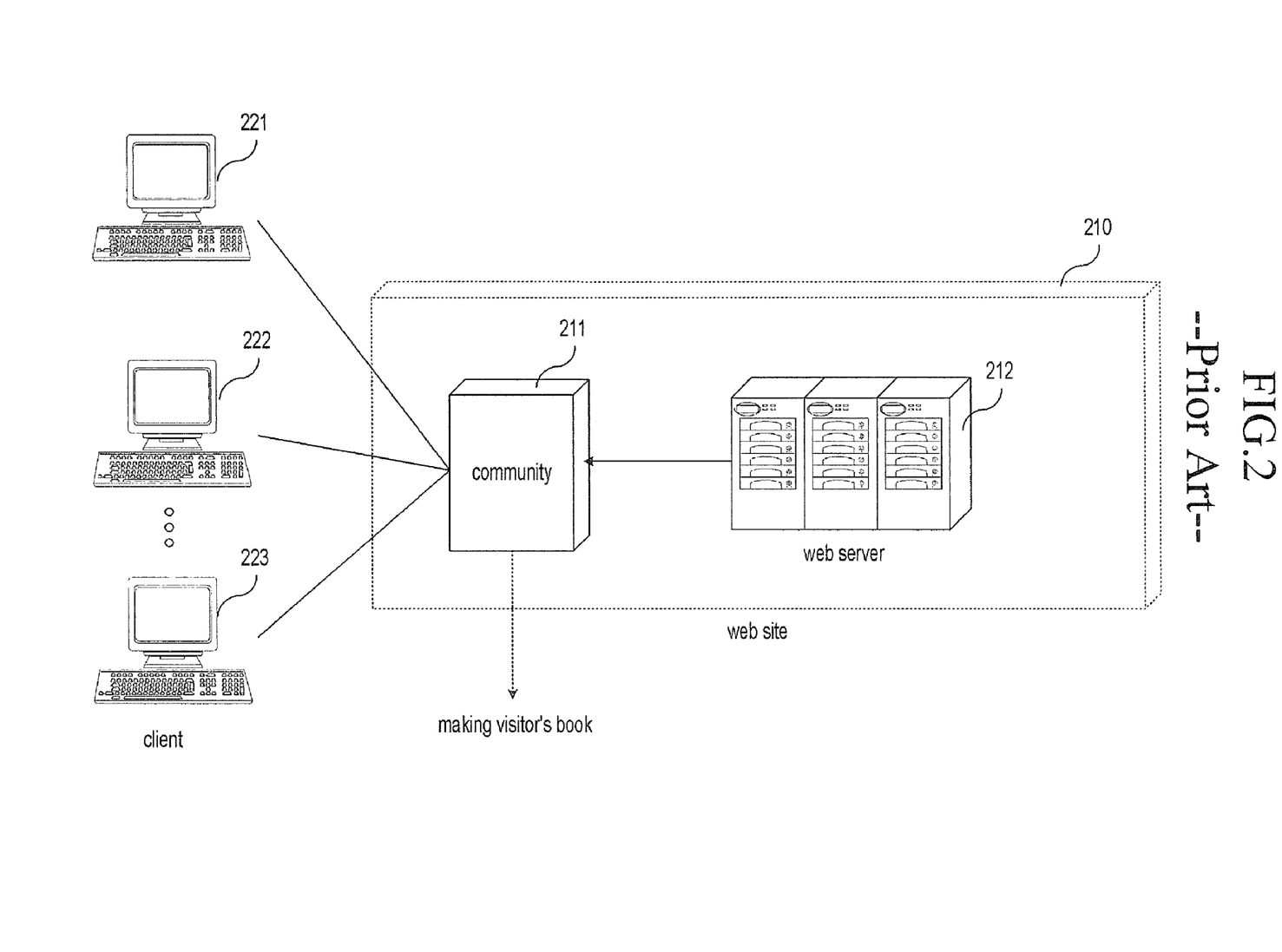
FIG. 2 is a diagram illustrating an example of a conventional website having a community and a contents server.
Figure 3:
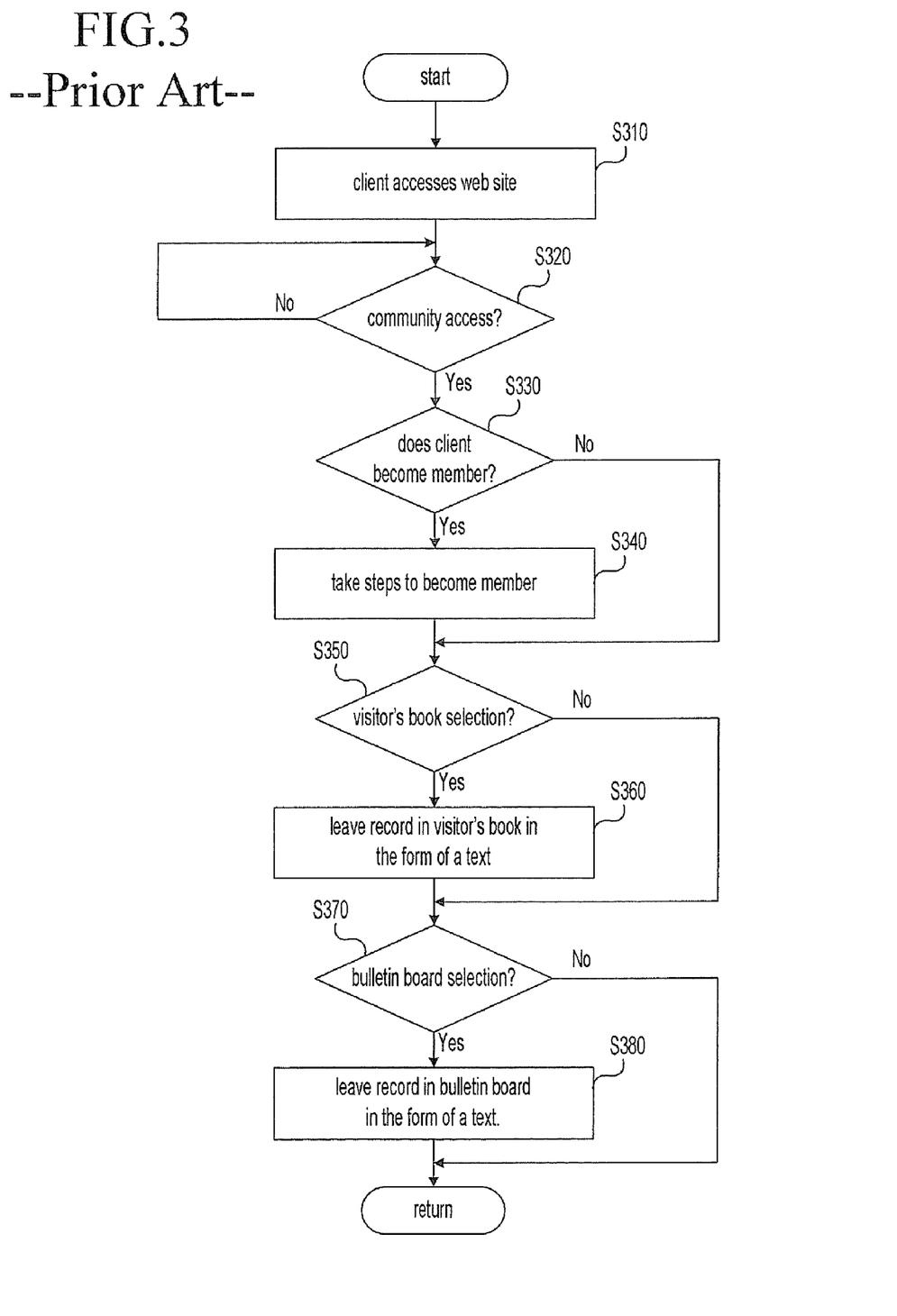
FIG. 3 is a flow chart illustrating a conventional process of leaving a record in a bulletin board and a visitor's book.

FIG. 2 is a diagram illustrating an example of a conventional website having a community and a contents server, and FIG. 3 is a flow chart illustrating a conventional process of leaving a record in a bulletin board and visitor's book.

Referring to FIG. 2, a conventional website 210 can include a community 211 accessed by a plurality of clients 221, 222, and 223 and a contents server 212 providing a plurality of contents to the community 211. In this case, the plurality of clients 221, 222, and 223 access the community 211 and can leave a record in the form of a text in a bulletin board and a visitor's book provided by the community 211.

Referring to FIG. 3, in the conventional process of leaving the record in the bulletin board and visitor's book, the plurality of clients 221, 222, and 223 access the web site 210 (S310) and then access the community 211 established in the web site 210 (S320).

If the community 211 invites the clients to become a member (S330), the clients join the community 211 by taking steps to become a member (S340). To become a member depends on selection of the clients 221, 222, and 223 and it is not essential to making an entry in a visitor's book or a bulletin board.

Thereafter, the clients 221, 222, and 223 select the visitor's book (S350) and can leave a record in the form of a text in the visitor's book (S360).

In addition, the clients 221, 222, and 223 can select the bulletin board (S370) and can leave a record in the form of a text on the bulletin board (S380).

Also, in a community, for example, a blog that is a single community, a host desires to please visitors and feels enjoyment and satisfaction from a visitor's positive feedback. In this connection, conventional blogs have problems in that items attracting strangers' visits and inducing enjoyment are standardized. Also, conventional methods of leaving a record in the bulletin board and visitor's book have a problem of limited interaction. Moreover, the methods are plain since the first consideration is given to texts.

DISCLOSURE

Technical Problem

In order to solve the above-mentioned problems, it is an object of the present invention to provide a system and method for visualizing community activity, which is capable of attracting participation of a plurality of visitors by providing community visitor's activity visually.

It is another object of the present invention to provide a system and method for visualizing community activity, which is capable of providing contents allowing a community visitor to participate in a community dynamically.

It is yet another object of the present invention to provide a system and method for visualizing community activity, which is capable of providing services specialized by blog items and creating customized services.

Technical Solution

To achieve the above objects, according to an aspect, the present invention provides a method for visualizing a visitor's activity in a community established on a web site, the method including the steps of:

a) by a visitor, accessing the community and selecting a community activity visualizing item prepared in the community;

b) by the visitor, selecting one of a plurality of blocks forming an image of the community activity visualizing item;

c) by the visitor, leaving a visitor log in a text input window corresponding to the selected block; and d) storing data in which the visit log is recorded and updating the community activity visualizing item.

Preferably, the community activity visualizing item is in the form of a cross-stitch item activating each of the blocks to complete an image shape.

According to another aspect, the present invention provides a system for visualizing visitor activity in a community established on a web site, including:

a connector for determining whether or not a community visitor is permitted to access the community;

a community activity visualizing item composed of a plurality of blocks for activating each of the blocks to record the visit log;

an item management unit for managing the visitor's access to the community, selecting the community activity visualizing item prepared in the community, and making and storing the visit log; and an item database for storing data of the visit log made in the community activity visualizing item and updating the community activity visualizing item.

According to yet another aspect, the present invention provides an item for visualizing visitor activity in a community established on a web site, including:

a plurality of blocks for forming an image, the plurality of blocks being selected to be recorded by a visitor when the visitor visits the community;

a text input window provided to allow the visitor to record a visit log when the selected plurality of blocks are activated;

an editor for allowing the visitor to edit a record of the visit log; and a database for storing and updating the visit log data.

According to the present invention, by visually providing community activity visualizing items, which are contents allowing community visitors to dynamically participate in the community, a plurality of visitors can be attracted to participate in the community, the extent of participation of the visitors in the community increases, and re-visit of the visitors to the community can be promoted.

MODE FOR INVENTION

Hereinafter, a system and method for visualizing community activity according to embodiments of the present invention will be described in detail with reference to the accompanying drawings.

Figure 4:
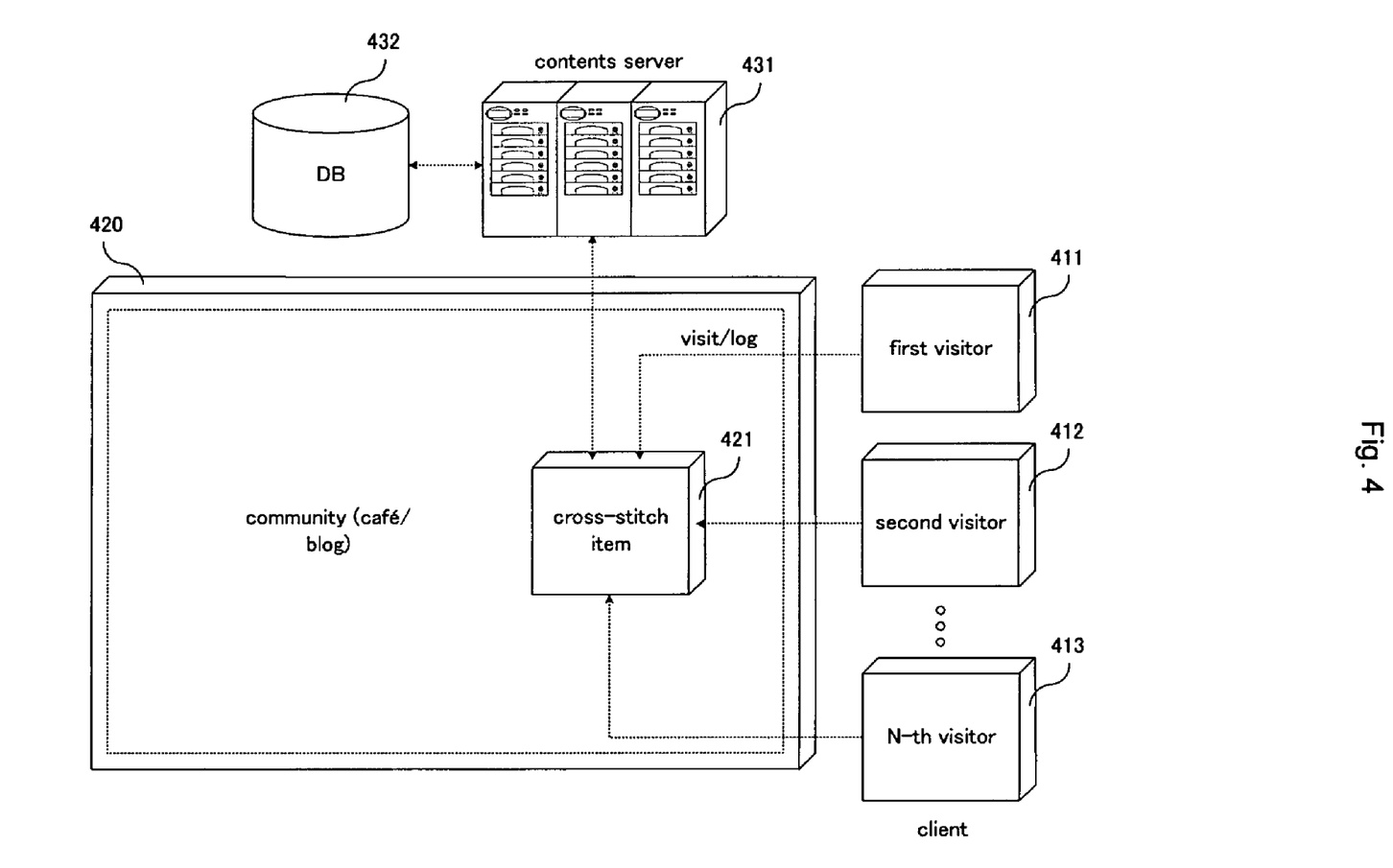
FIG. 4 is a schematic diagram illustrating a system for visualizing community activity according to an embodiment of the present invention.

FIG. 4 is a schematic diagram illustrating a system for visualizing community activity according to an embodiment of the present invention. This figure shows that a plurality of visitor clients 411, 412, and 413 access a community 420 established in a web site and can leave a visit log in a cross-stitch item 421. In such a case, the web site can include a contents server 431 and a database 432 to provide information related to the cross-stitch item 421 or stored data and the like.

Referring to FIG. 4, in the system for visualizing community activity according to the embodiment of the present invention, the community activity is activated by leaving a visit log or message of a visitor, who makes a visit to a blog or café 420 on the web site, in the cross-stitch item 421 in the form of a dot block icon. Here, the block, which is a basic unit for forming an image, refers to a set of pixels that can be indicated as a fixed area. The block can be expanded or reduced.

FIG. 4 shows that the plurality of visitor clients 411, 412, and 413 access the community 420 established in the web site and can leave a visit log in the cross-stitch item 421. In such a case, the web site can include the contents server 431 and the database 432 to provide information related to the cross-stitch item 421 or store data and the like.

Here, the cross-stitch refers to a European handicraft of embroidering with a cross shape on a cotton fabric called an Oxford fabric on which a pattern is designed. A traditional handicraft, which is to make a delicate stitch on a stiff cotton cloth, is difficult to embroider. However, on the contrary, since the cross-stitch is to embroider only on a fabric on which a pattern is designed in advance, the cross-stitch makes embroidery very easy as compared to the traditional handicraft. Thus, the system for visualizing community activity according to the embodiment of the present invention is preferably provided in the form of the cross-stitch.

Also, assuming that one dot or block form is one visit log, the cross-stitch item 421 is completed by filling dots or blocks, which are specified by a shape or by the prescribed number of times, with visit logs or messages. That is, a visitor can purchase and complete cross-stitch items that are provided as dot icons in various shapes, in each of which a visitor's visit log or message may be left, and activate community activity by presenting the completed cross-stitch item to his friends and the like.

Figure 5:
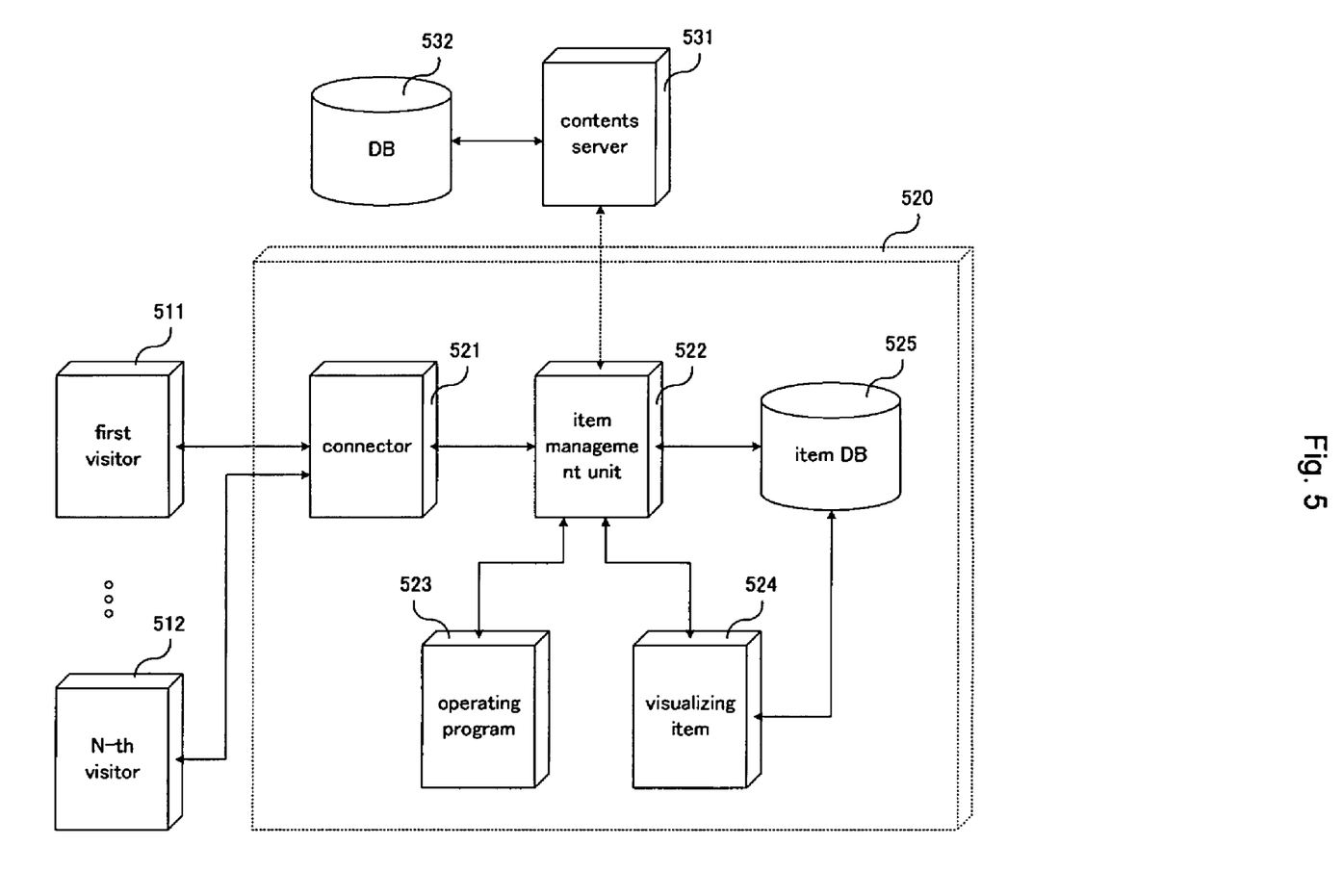
FIG. 5 is a diagram illustrating configuration of the system for visualizing community activity according to the embodiment of the present invention.

FIG. 5 is a diagram illustrating configuration of a community activity visualizing system according to the embodiment of the present invention.

Referring to FIG. 5, a community activity visualizing system 520 can include a connector 521, an item management unit 522, an application program 523, a visualizing item 524, and an item database 525. In such a case, it can further include an editor for editing a visit log record inputted to the visualizing item 524.

The connector 521 determines whether or not any visitors 511 and 512 who visit a community are permitted to access the community. For example, the connector 521 may perform procedures related to subscription and authentication of the visitors 511 and 512 according to operation methods of the community. In this case, visitors 511 and 512 may be a plurality of clients, and the community may be cafés, homepages, blogs, mini-rooms, or mini-homepages established in web sites on the Internet.

The community activity visualizing item 524 consists of a plurality of blocks forming images, and can activate each of the blocks to thereby cause the visit log to be recorded.

At this time, the plurality of blocks forming images of the visualizing item 524 are provided in the form of a dot block icon, and provide information on the overall number of blocks in which visit logs can be recorded, the number of blocks recorded up to date, or the number of recordable blocks. In this case, visit log record data inputted to the plurality of blocks include visitor identifications, visit time, or record contents. Also, the visualizing item 524 is provided in the form of a cross-stitch item completing an image shape by activating each of the blocks, and, when all of the visit log data are accumulated in the visualizing item 524 to complete the visualizing item 524, the completed visualizing item 524 may be provided to a visitor's friends or neighborhoods.

The item management unit 522 manages the accessed visitors' 511 and 512 selected community activity visualizing items prepared in the community and makes and stores the visit logs. In such a case, the item management unit 522 can store data related to the cross-stitch item in the contents server 531 and the database 532 in the web site.

The item database 525 stores the data of the visit logs made in the visualizing item, updates the visualizing item, and accumulates the data of the visit logs recorded whenever any visitors visit the community.

The application program 523 may be a bulletin board, an editor, or a visitor's book, and the like, required to operate the community.

Figure 6:
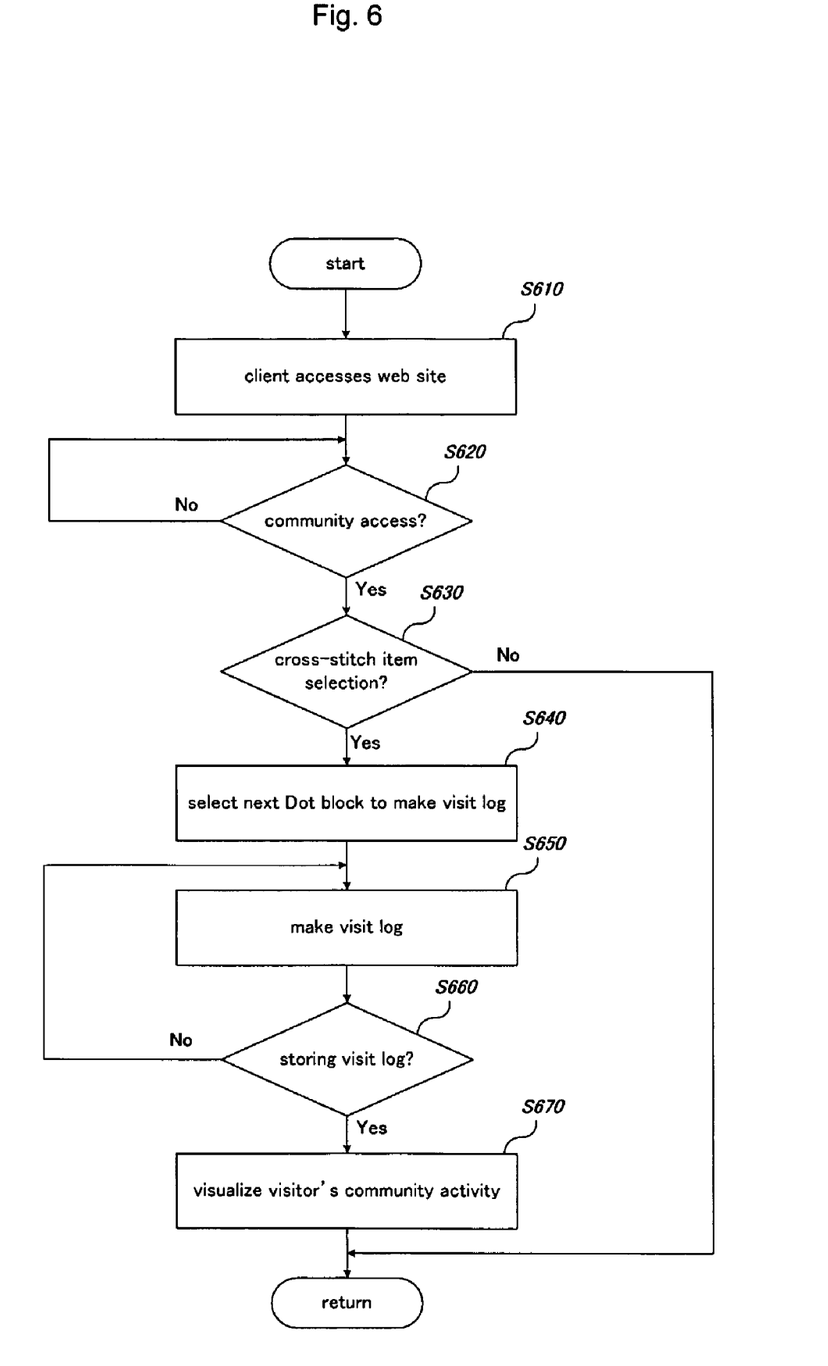
FIG. 6 is a flow chart illustrating a method for visualizing a community activity according to an embodiment of the present invention.

FIG. 6 is a flow chart illustrating a method for visualizing community activity according to an embodiment of the present invention.

Referring to FIG. 6, in a community activity visualizing method according to an embodiment of the present invention, a visitor accesses a web site (S610) and then accesses a community desired by the visitor (S620). Thereafter, a cross-stitch item, which is a community activity visualizing item prepared in the community, is selectively executed (S630). Here, the visualizing item has the form of a cross-stitch item completing an image shape by activating each of the blocks. The cross-stitch item accumulates data of the visit logs recorded whenever any visitors visit the community.

Thereafter, the visitor selects one of the plurality of blocks forming an image of the visualizing item (S640). In such a case, the visualizing system can automatically assign a next order of an existing created block.

The plurality of blocks forming an image of the visualizing item can be provided in the form of a dot block icon. For example, pre-selected and recorded blocks among the plurality of blocks are highlighted, and any visitor can inspect the visit log.

At this time, the visualizing item can provide information on the overall number of blocks in which visit logs can be recorded, the number of blocks recorded up to date, or the number of recordable blocks. Also, visit log record data inputted to the plurality of blocks include visitor IDs, visit time, or record contents.

Next, the visitor leaves the visit log in a text input window corresponding to the selected block (S650). Thereafter, the data in which the visit log is stored are stored and the visualizing item is updated (S660). Accordingly, the visualizing item visualizes a visitor's community activity (S670).

Meanwhile, the visualizing item is purchased from the web site and established in the community. Also, the number of visit logs which can be left in the visualizing item can be determined according to the kind of item sold in the web site. For example, the kind of cross-stitch item can be changed according to the number of dot blocks in which visit logs can be made.

Also, when the visualizing item visualizing a community visitor's activity is completed, when all of the visit log data are accumulated in the visualizing item, the completed visualizing item may be provided to a visitor's friends or neighborhoods. Also, in a case where the visitor records a visit log for the visualizing item, a prize winning event can be provided. For example, a community host can provide a prize to the hundredth visitor that makes a visit log.

Figure 7:
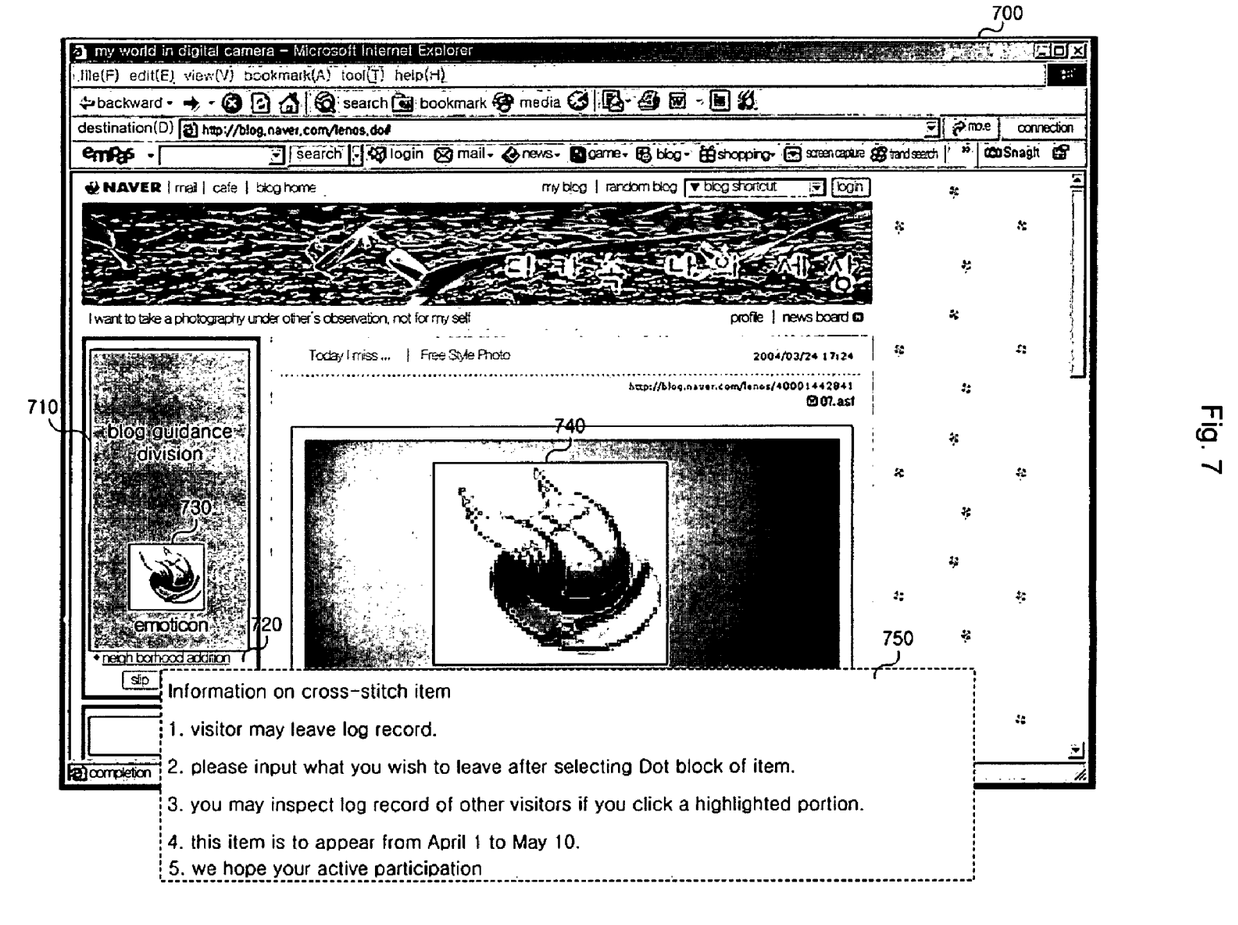
FIG. 7 is a diagram illustrating a blog having a cross-stitch item to visualize community activity according to an embodiment of the present invention.

FIG. 7 is a diagram illustrating a blog having a cross-stitch item to visualize community activity according to an embodiment of the present invention. As shown in FIG. 7, a blog guidance division 710 having a profile of a blogger who is a blog owner and a safety bulletin board 720 is shown in the left side of a blog screen 700, and the blog guidance division 710 can include an emoticon 730 of the cross-stitch item. The emoticon 730 is provided in the form of an image in which a block is not included, and can be located at any place in the blog.

In addition, for example, a cross-stitch item execution window 740 is shown in the center of the screen and a cross-stitch item notice 750 is shown in the bottom of the screen. Here, the visitor can execute the cross-stitch item and can leave a visit log according to the cross-stitch item notice 750.

Figure 8:
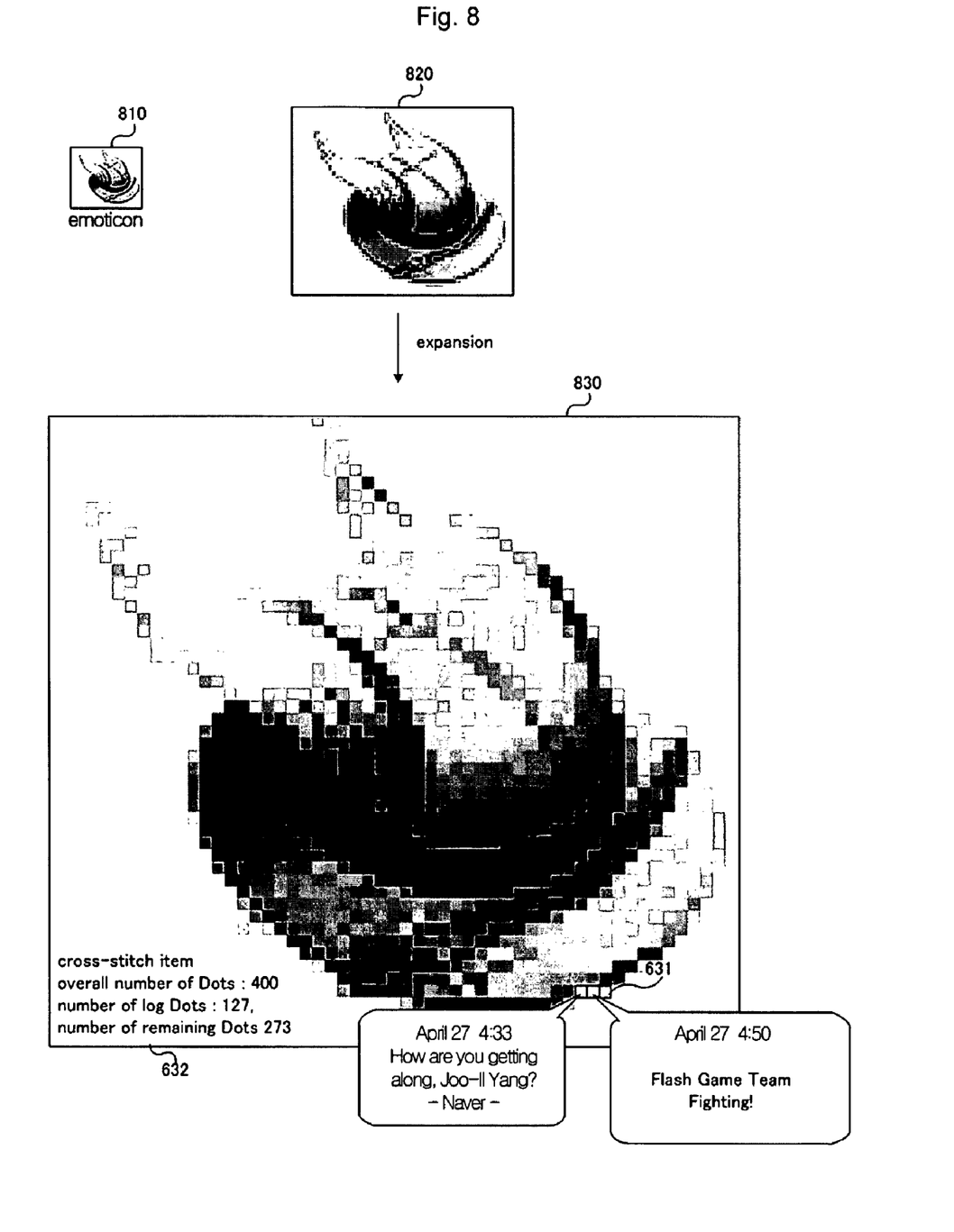
FIG. 8 is a diagram illustrating an example of the cross-stitch item of FIG. 7.
Figure 9:
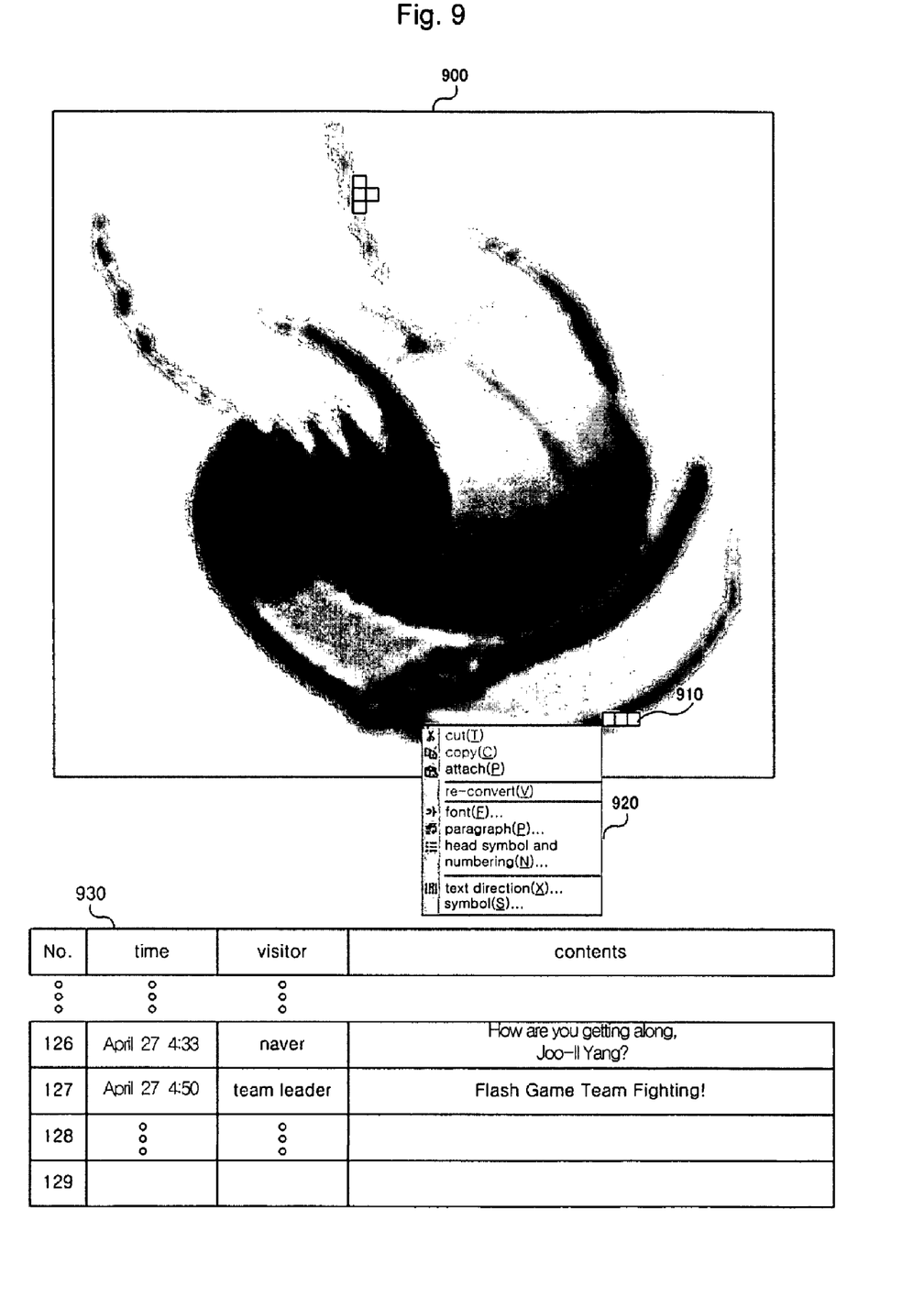
FIG. 9 is a diagram illustrating an example of leaving a visit log in the cross-stitch item of FIG. 7.

FIG. 8 is a diagram illustrating an example of the cross-stitch item shown in FIG. 7, and FIG. 9 is a diagram illustrating an example of leaving a visit log in the cross-stitch item shown in FIG. 7.

Referring to FIG. 8 and FIG. 9, as an example of the cross-stitch item according to an embodiment of the present invention, a cross-stitch item emoticon 810 is provided in the form of an image in the blog screen, as mentioned above, and a cross-stitch item execution window 820 consisting of blocks is provided when the emoticon 810 is selected. Thereafter, if the cross-stitch item execution window 820 is expanded or a block is selected, an expanded cross-stitch item execution window 830 is displayed as shown in the figure.

Here, the cross-stitch item can include a plurality of blocks, a text input window, an editor, and a database. That is, the visualizing item is provided in the form of a cross-stitch item accumulating the visit log data to complete an image shape by activating each of the blocks.

Also, the plurality of blocks are selected to allow the visitor to record a visit log at the time of visiting the community and form an image. When the selected plurality of blocks are activated, the visitor records a visit log through the text input window. At this time, the visitor can edit the record of the visit log through the editor. Thereafter, the database stores and updates the visit log data.

Referring to FIG. 8 again, the cross-stitch item provides information on the overall number of dot blocks, the number of dot blocks in which visit logs are recorded, the remaining number of blocks, and the like. In addition, an input window appears when the visitor selects one of the remaining blocks or a block that is automatically selected by the visualizing system. The visitor records a visit log in the input widow using an editor. Here, reference numeral 631 denotes a dot block in which a visit log is recorded. For example, the dot block can be highlighted to allow a visitor to inspect the visit log.

Referring to FIG. 9, an expanded cross-stitch execution window 900 provides the dot block in which the visit log is recorded, the currently remaining blocks, and the like. At this time, if the visitor presses a right button of a mouse, for example, the visitor can enter an editor's edition mode 920, as shown in the figure. Also, if a highlighted dot block 910, in which a visit log is recorded, is selected a visit log given as a table 930 in the form of a text may be displayed.

In the end, by utilizing the cross-stitch item, pleasure through interaction with strangers in the blog can satisfy the basic desire of visitors, and thus, the extent of loyalty and participation with the service of the visitors in the blog increases, and a network of bloggers possessing the blog can be extended.

Although the exemplary embodiments of the present invention have been described in detail, it is obvious to those skilled in the art that the present invention is not restricted in the embodiments and may be modified or changed in various forms without deviating from the spirit and scope of the invention as set forth in the annexed claims.

INDUSTRIAL APPLICABILITY

According to the present invention, by visually providing community activity visualizing items, which are contents allowing community visitors to dynamically participate in the community, a plurality of visitors can be attracted to participate in the community, the extent of participation of the visitors in the community increases, and re-visit of the visitors to the community can be promoted.

The invention claimed is:

1. A computer-implemented method for visualizing a user's activity in an online social network, comprising:
   providing a plurality of cells to form a pattern, the pattern being formed associated with a progress of one or more users' blog activities and in response to a detection of users' selection of the cells, each of the cells corresponding to an input area of the blog activities comprising checking, visiting, posting, texting and commenting by one of more users,
   wherein the pattern is a figure that is displayed as a completed figure upon reaching a reference threshold level of users' blog activities; and
   displaying the cells to form a completion of the pattern according to the progress of the users' blog activities, wherein displaying the cells associated with the progress of the blog activities is visualized to user terminals via a network according to a degree of the users' participation of the blog activities.

2. The method of claim 1, further comprising:
   displaying a colored graphic image to form the pattern in a manner visible to one or more of the user terminals by changing the color of the each cells in response to detection of each progress of the users' blog activities.

3. The method of claim 1, wherein each cell comprises a dot, a block and a pixel to form the pattern.

4. The method of claim 1, wherein displaying the cells to form a completion of the pattern comprises highlighting the color.

5. The method of claim 1, further comprising:
   providing at least one of information associated with displaying a degree of progressing of the blog activities the information comprising a number of the cells whose color is changeable, a number of the cells whose color has been changed, and a number of available cells associated with the blog activities.

6. The method of claim 1, further comprising:
   an input interface configured to store at least one of a user identification, a visit time, record contents or any combinations thereof.

7. The method of claim 1, further comprising:
   detecting whether the user wins in a prize winning event in response to detection of the users' selection of the cells associated with the progress of the users' blog activities.

8. The method of claim 1, further comprising:
   providing a pop-up window in response to detection of a placement of a cursor over a cell whose color has been changed, wherein the pop-up window shows the message previously inputted by a user.

9. An apparatus for visualizing visitor activity in an online social network, the apparatus comprising:
   a management unit configured to provide a plurality of blocks to form an image, the image being formed associated with a progress of one or more users' blog activities in response to detection of visitors' selection of the blocks and each of the blocks configured to record a visit log by one or more of visitors,
   wherein the image is a figure that is displayed as a completed figure upon reaching a reference threshold level of users' blog activities; and
   a database configured to store log data associated with web log activities of the visitors to update the image, and to accumulate visit log records, the log data comprising checking, visiting, posting, texting and commenting of the web log activities,
   wherein each block comprises a color, and the color of the block of the entire image changes in response to detection of a progress of each visitor's web log activities, and wherein the changed color of the blocks are displayed according to each visitor's participation associated with the web log activities.

10. The apparatus of claim 9, further comprising:
    a pop-up window configured to display a visit log previously inputted in response to detection of a placement of a cursor over a block whose color has been changed.

11. A computer-implemented method for visualizing a user's activity in an online social network, the method comprising:

provi­ding a plurality of blocks to form a pattern, the pattern being formed associated with a progress of one or more of users' web log activities and in response to a detection of user's selection of the blocks, each of the blocks corresponding to an input area of the log activities comprising checking, visiting, posting, texting and commenting by the users, wherein the pattern is a figure that is displayed as a completed figure upon reaching a reference threshold level of users' blog activities; and displaying the blocks to form a completion of the pattern according to the progress of the users' log activities, wherein displaying the blocks associated with the progress of the log activities is visualized to user terminals via a network according to a degree of each of the users' participation of the log activities.

* * * * *